United States Patent
Fuchs

[15] 3,663,050
[45] May 16, 1972

[54] WEED REMOVING TOOL

[72] Inventor: Alfred Fuchs, 238 Oakland Ave., Central Islip, N.Y. 11722

[22] Filed: Jan. 28, 1971

[21] Appl. No.: 110,411

[52] U.S. Cl............................................294/50, 294/61
[51] Int. Cl. .......................................................A01k 81/04
[58] Field of Search...........................294/50, 50.5, 61

[56] References Cited

UNITED STATES PATENTS

| 2,732,242 | 1/1956 | Belford | 294/61 |
| 1,092,818 | 4/1914 | Bittner | 294/50.5 |

*Primary Examiner*—Evon C. Blunk
*Assistant Examiner*—Johnny D. Cherry

[57] ABSTRACT

A device for removing crab grass, dandelions, and the like. This device includes a sleeve having prongs extended therefrom for engaging the plant in order to pull it out of the ground with the roots.

1 Claim, 3 Drawing Figures

PATENTED MAY 16 1972 3,663,050

INVENTOR
Alfred Fuchs

WEED REMOVING TOOL

This invention relates to garden tools, and more particularly to a weed removing tool.

It is therefore the primary purpose of this invention to provide a weed removing tool which will quickly and easily weed, remove it, roots and all.

Another object of this invention is to provide a weed removing tool which will have an elongated sleeve member which will carry a slideable dowel having a rubber handle, the device when urged downwards upon by the handle will puncture the plant and by twisting the handle the roots and plant will be removed from the ground in a lifting motion, after which the plant may be easily removed therefrom.

A further object of this invention is to provide a tool of the type described which will be easy to operate and will prevent the former tendency of having to pull or dig the weed from the ground.

Other objects of the present invention are to provide a weed removing tool which is simple in design, inexpensive to manufacture, rugged in construction, easy to use and efficient in operation.

These and other objects will be readily evident upon a study of the following specification and the accompanying drawing wherein.

Figure 1:
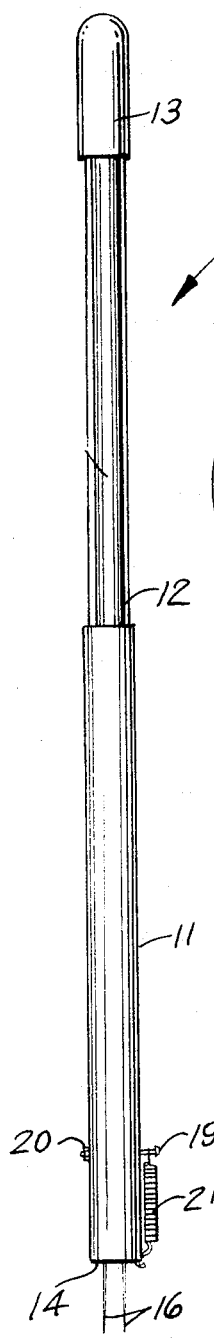
FIG. 1 is a vertical view of the present invention shown in elevation.
Figure 2:
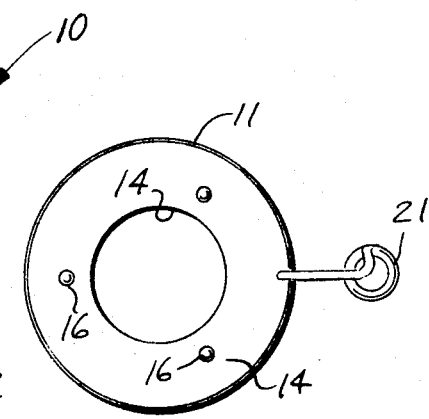
FIG. 2 is an enlarged view taken along the lines 2—2 of FIG. 3.
Figure 3:
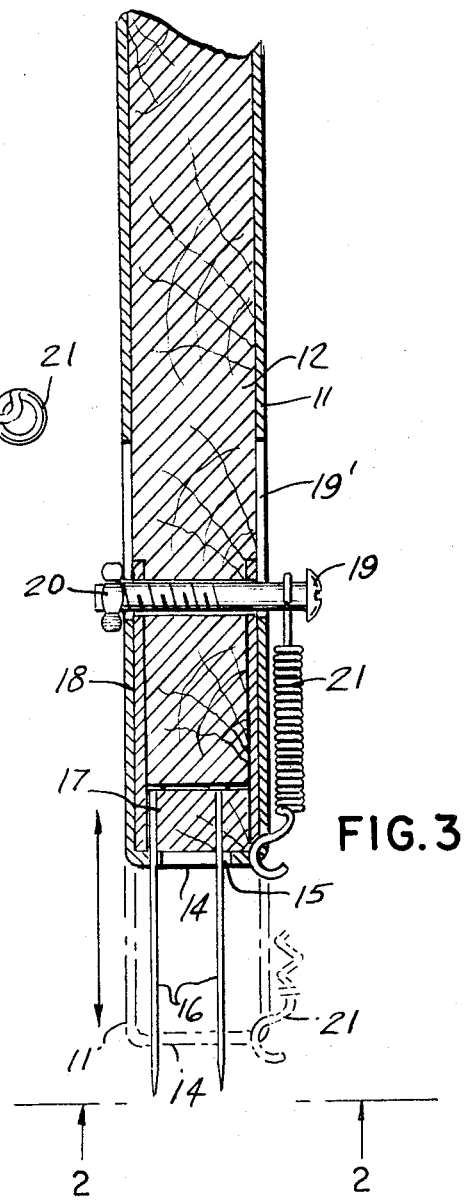
FIG. 3 is an enlarged fragmentary view of FIG. 1.

According to this invention, a weed removing tool 10 is shown to include an elongated sleeve 11 made of aluminum or other suitable material.

An elongated dowel 12 is carried within sleeve 11 telescopingly and has provided at its outer end, a rubber handle 13 for the operation of tool 10.

The end wall 14 of sleeve 11 is provided with a central opening 15 through which extends a plurality of equally spaced apart and sharpened prongs 16 which are carried fixedly within a block 17 within the lower extremity of sleeve 11.

A sleeve 18 is carried within the lower extremity of sleeve 11 and transversely carries a bolt fastener 19 having threaded onto it a nut fastener 20, the bolt fastener 19 being slideable within the transverse slot 19' of sleeve 11.

A coil spring 21 is secured at one end to the extending bolt fastener 19 and is secured at its other end to the end wall 14.

Tool 10 is used by grasping the handle 13 and urging tool 10 downwards onto the weed to be extracted and when doing so the prongs 16 puncture the weed and with a rotating motion of approximately 100°, the tool is withdrawn thus bringing the weed and the roots with it in order insure that no more growth will be expected in the future.

It shall be noted that holding the sleeve 11 and pushing forward causes sleeve 11 to remove the weed from the prongs 16.

It shall further be noted that the operation of removing a weed with tool 10 will not cause any large opening in the ground that may be seen, the resulting weed pulling with tool 10 thus leaving a mark that will not be noticed.

What I claim is:

1. A weed removing tool, comprising an elongated large sleeve member, a dowel portion slideably carried within said large sleeve providing a means through the handle of the tool for penetrating a weed and removing it and its roots from the ground, prong means carried by said tool for engaging said weed and its roots, a small sleeve carried within said large sleeve for retaining a transverse bolt means which at one end holds a compression coil spring which serves to return the tools to its normal extended position, said tool carrying a plurality of spaced apart and sharpened prongs, said prongs being secured within a block member within said small sleeve, said prongs extending from a central opening through an end wall of said large sleeve in order to puncture said weed and twist said weed as it is being removed from the ground along with its roots, said bolt fastener carrying said spring being transversely received through a slot through said large sleeve, said bolt extending transversely through said short sleeve and being freely slideable within said slot of said large sleeve when said tool is operated, the other end of said compression coil spring being secured to said large sleeve end wall, said tool being operated by urging down upon said handle, the lower extremity of said elongated large sleeve touching the ground, said prongs puncturing and securing said weed to said tool when said tool is rotated and lifted upwardly, the result being that said weed and its roots are both removed simultaneously by use of said tool, said weed being extracted or removed from said tool by urging said large sleeve downwardly, thus ejecting said weed and its associated roots from said tool.

* * * * *